(12) United States Patent
Roessle (10) Patent No.: US 11,338,639 B2
(45) Date of Patent: May 24, 2022

(54) DAMPER WITH SOLENOID IN PISTON ROD

(71) Applicant: Tenneco Automotive Operating Company Inc., Lake Forest, IL (US)

(72) Inventor: Matthew L. Roessle, Temperance, MI (US)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 118 days.

(21) Appl. No.: 16/884,395

(22) Filed: May 27, 2020

(65) Prior Publication Data
US 2020/0376915 A1    Dec. 3, 2020

Related U.S. Application Data

(60) Provisional application No. 62/855,182, filed on May 31, 2019.

(51) Int. Cl.
| | |
|---|---|
| *B60G 17/08* | (2006.01) |
| *B60G 17/052* | (2006.01) |
| *B60G 17/015* | (2006.01) |

(52) U.S. Cl.
CPC ..... *B60G 17/0528* (2013.01); *B60G 17/0155* (2013.01); *B60G 17/08* (2013.01); *B60G 2500/114* (2013.01); *B60G 2500/204* (2013.01)

(58) Field of Classification Search
CPC ............ B60G 17/0528; B60G 17/0155; B60G 17/08; B60G 2500/114; B60G 2500/204
See application file for complete search history.

(56) References Cited

U.S. PATENT DOCUMENTS

| | | | |
|---|---|---|---|
| 4,682,675 A | 7/1987 | Eddy, Jr. | |
| 4,696,379 A | 9/1987 | Yamamoto et al. | |
| 5,123,671 A * | 6/1992 | Driessen | B60G 17/018 188/266.5 |
| 5,217,095 A * | 6/1993 | Lizell | B60G 17/015 188/266.5 |
| 5,653,315 A * | 8/1997 | Ekquist | B60G 17/015 188/266.4 |

(Continued)

FOREIGN PATENT DOCUMENTS

| | | |
|---|---|---|
| CN | 100372697 C | 3/2008 |
| CN | 108458027 A | 8/2018 |
| JP | 2003222179 A | 8/2003 |

*Primary Examiner* — Toan C To (57) ABSTRACT

A shock absorber includes: a pressure tube defining a working chamber; a piston assembly slidably disposed within the pressure tube, the piston assembly dividing the working chamber into a first and second chambers; a piston rod including a first end that is attached to the piston assembly and that includes a second end that is configured to be attached to one of a sprung mass and an unsprung mass of a vehicle; an electronic valve that is positioned within the piston rod, the electronic valve including a spool moveable between first and second positions, where: when the spool of the electronic valve is in the first position, the spool allows fluid flow between the first and second chambers through the electronic valve and the piston rod; and when the spool of the electronic valve is in the second position, the spool restricts fluid flow between the first and second chambers.

26 Claims, 9 Drawing Sheets

(56) References Cited

U.S. PATENT DOCUMENTS

| | | | |
|---|---|---|---|
| 5,797,594 A * | 8/1998 | Sekine | B60G 15/07 188/315 |
| 6,668,986 B2 | 12/2003 | Moradmand et al. | |
| 6,959,796 B2 * | 11/2005 | DeGronckel | F16F 9/062 188/313 |
| 9,150,077 B2 | 10/2015 | Roessle et al. | |
| 9,163,691 B2 | 10/2015 | Roessle et al. | |
| 9,810,282 B2 | 11/2017 | Roessle et al. | |
| 9,879,746 B2 | 1/2018 | Keil et al. | |
| 9,879,748 B2 | 1/2018 | Roessle et al. | |
| 10,000,104 B2 | 6/2018 | Blankenship et al. | |
| 11,065,932 B2 * | 7/2021 | Laird | B60G 13/08 |
| 11,173,765 B2 * | 11/2021 | Ericksen | F16F 9/5126 |
| 2002/0108826 A1 * | 8/2002 | Miller | B60G 17/08 188/280 |
| 2015/0081171 A1 * | 3/2015 | Ericksen | F16F 9/512 701/37 |

\* cited by examiner

DAMPER WITH SOLENOID IN PISTON ROD

CROSS-REFERENCE TO RELATED APPLICATIONS

This application claims the benefit of U.S. Provisional Application No. 62/855,182, filed on May 31, 2019. The entire disclosure of the above application is incorporated herein by reference.

FIELD

The present disclosure relates to a hydraulic damper or shock absorber for use in a suspension system of a vehicle and more particularly to a damper having an integrated electronic system and a valve.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Shock absorbers are used in conjunction with vehicle suspension systems to absorb unwanted vibrations during driving. To absorb the unwanted vibrations, shock absorbers are generally connected between the sprung portion (body) of the vehicle and the unsprung portion (suspension) of the vehicle.

Vehicles may be equipped with an electrically adjustable damping system that includes an electrically adjustable hydraulic shock absorber. Such adjustable shock absorbers may include an electromechanical valve/actuator disposed therein. A main control unit disposed within the vehicle is used to control the damping state of each of the adjustable shock absorbers by controlling the actuation of the electromechanical valve.

SUMMARY

A shock absorber of a vehicle includes a pressure tube that defines a working chamber. A piston assembly slides within the pressure tube and divides the working chamber into a first chamber and a second chamber. A piston rod is attached at one end to the piston assembly. The other end of the piston rod is configured to be attached to one of a sprung mass of the vehicle and an unsprung mass of the vehicle.

The shock absorber could include multiple valves, such as valves located within a rod guide, that control fluid flow between the first and second chambers. Each of the valves could be individually opened to allow fluid flow between the first and second chambers or closed to prevent fluid flow between the first and second chambers. The damping force provided by the shock absorber may decrease as the number of the valves open increases and vice versa.

According to the present disclosure, the shock absorber includes only one valve that is located within the piston rod. A printed circuit board assembly (PCBA) that includes hardware components that control opening and closing of the valve is also located within the piston rod. The valve and the PCBA being located within the shock absorber decreases an overall size of the shock absorber and may decrease a cost of the shock absorber. The shock absorber having only the one valve may also decrease a cost of the shock absorber relative to a shock absorber having multiple valves.

The valve may allow fluid flow at up to a first maximum flowrate between the first and second chambers when the valve is in an open position. The valve may block fluid flow between the first and second chambers when the valve is in a closed position. The valve may also be configured to allow fluid flow at up to a second maximum flowrate between the first and second chambers when the valve is in a position between the open position and the closed position. The second maximum flowrate is less than the first maximum flowrate.

The (one) valve can therefore provide three different damping forces: a first damping force when the one valve is in the closed position, a second damping force (less than the first damping force) when the one valve is between the open and closed positions, and a third damping force (less than the second damping force) when the one valve is in the open position. The ability to allow fluid flow at up to the second maximum flow rate when the valve is in positions between the open position and the closed position may provide for smoother and less noisy transitions from the first damping force to the third damping force.

In a feature, a shock absorber includes: a pressure tube defining a working chamber; a piston assembly slidably disposed within the pressure tube, the piston assembly dividing the working chamber into a first chamber and a second chamber; a piston rod including a first end that is attached to the piston assembly and that includes a second end that is configured to be attached to one of a sprung mass and an unsprung mass of a vehicle; an electronic valve that is positioned within the piston rod, the electronic valve including a spool moveable between a first position and a second position, where: when the spool of the electronic valve is in the first position, the spool allows fluid flow between the first and second chambers through the electronic valve and the piston rod; and when the spool of the electronic valve is in the second position, the spool restricts fluid flow between the first and second chambers.

In further features, the shock absorber does not include any other electronic valves.

In further features, the electronic valve includes: the spool; a biasing device configured to bias the spool toward the second position; and an inductor coil configured to draw the spool toward the first position when electrical power is applied to the inductor coil.

In further features, the biasing device is located within a cavity formed in the spool.

In further features, the electronic valve further includes: a housing; and a body located coaxially within the housing, where the spool, the inductor coil, and the biasing device are located within the body.

In further features: the spool includes first apertures; the body includes second apertures; the piston rod includes third apertures that are in fluid communication with the second apertures of the body; and the first apertures are in fluid communication with the second apertures when the spool is in the first position.

In further features, the spool is configured to block fluid flow between the first and second apertures when the spool is in the second position.

In further features: the body further includes: fourth apertures located on an inner surface of the body; flow channels that fluidly connect the fourth apertures with the second apertures; and the spool further includes fifth apertures formed in an outer surface of the spool that are in fluid communication with the fourth apertures when the spool is in a position between the first position and the second position.

In further features, the spool is configured to block fluid flow between the fifth and fourth apertures when the spool is in the second position.

In further features: the body further includes: fourth apertures located on an inner surface of the body; flow channels that fluidly connect the fourth apertures with the second apertures; and the spool further includes an annular groove formed in an outer surface of the spool that is in fluid communication with the fourth apertures when the spool is in a position between the first position and the second position.

In further features, the electronic valve is configured to: allow fluid flow between the first and second chambers at up to a first maximum flow rate when the spool is between the first position and the second position; and allow fluid flow between the first and second chambers at up to a second maximum flow rate that is greater than the first maximum flow rate when the spool is in the first position.

In further features: a sleeve located within the piston rod; and a printed circuit board assembly (PCBA) that is located within the sleeve.

In further features, the PCBA includes a coil activation module configured to selectively apply power to the electronic valve.

In further features: the sleeve includes grooves formed in an inner surface of the sleeve; and the PCBA includes lateral sides that are slidably disposed within the grooves.

In a feature, a shock absorber includes: a pressure tube defining a working chamber; a piston assembly slidably disposed within the pressure tube, the piston assembly dividing the working chamber into a first chamber and a second chamber; a piston rod including a first end that is attached to the piston assembly and that includes a second end that is configured to be attached to one of a sprung mass and an unsprung mass of a vehicle; an electronic valve including a spool moveable between a first position and a second position, where: when the spool of the electronic valve is in a first position, allow fluid flow between the first and second chambers; and when the spool of the electronic valve is in a second position, block fluid flow between the first and second chambers; and a printed circuit board assembly (PCBA) that is located within the piston rod and that includes a module configured to selectively apply power to the electronic valve.

In further features, the shock absorber further includes a sleeve that is located within the piston rod, where the PCBA is located within the sleeve.

In further features: the sleeve includes grooves formed in an inner surface of the sleeve; and the PCBA includes lateral sides that are slidably disposed within the grooves.

In further features, the shock absorber does not include any other electronic valves.

In further features, the electronic valve includes: the spool; a biasing device configured to bias the spool toward the second position; and an inductor coil configured to draw the spool toward the first position when electrical power is applied to the inductor coil.

In further features, the electronic valve further includes: a housing; and a body located coaxially within the housing, where the spool, the inductor coil, and the biasing device are located within the body.

In further features: the spool includes first apertures; the body includes second apertures; the piston rod includes third apertures that are in fluid communication with the second apertures of the body; and the first apertures are in fluid communication with the second apertures when the spool is in the first position.

In further features, the spool is configured to block fluid flow between the first and second apertures when the spool is in the second position.

In further features: the body further includes: fourth apertures located on an inner surface of the body; flow channels that fluidly connect the fourth apertures with the second apertures; and the spool further includes fifth apertures formed in an outer surface of the spool that are in fluid communication with the fourth apertures when the spool is in a position between the first position and the second position.

In further features, the spool is configured to block fluid flow between the fifth and fourth apertures when the spool is in the second position.

In further features: the body further includes: fourth apertures located on an inner surface of the body; flow channels that fluidly connect the fourth apertures with the second apertures; and the spool further includes an annular groove formed in an outer surface of the spool that is in fluid communication with the fourth apertures when the spool is in a position between the first position and the second position.

In further features, the electronic valve is configured to: allow fluid flow between the first and second chambers at up to a first maximum flow rate when the spool is between the first position and the second position; and allow fluid flow between the first and second chambers at up to a second maximum flow rate that is greater than the first maximum flow rate when the spool is in the first position.

In a feature, a shock absorber includes: a pressure tube defining a working chamber; a piston assembly slidably disposed within the pressure tube, the piston assembly dividing the working chamber into a first chamber and a second chamber; a piston rod including a first end that is attached to the piston assembly and that includes a second end that is configured to be attached to one of a sprung mass and an unsprung mass of a vehicle; an electronic valve that is positioned within the piston rod, the electronic valve including a spool moveable between a first position and a second position, the spool including a first flow channel and a second flow channel that is distinct from the first flow channel, where: when the spool of the electronic valve is in the first position, fluid flows through both of the first and second flow channels; when the spool of the electronic valve is in the second position, the spool restricts fluid flow through both of the first and second channels; and when the spool of the electronic valve is at least temporality positioned at a third position that is between the first and second positions, fluid flows through the first flow channel and the spool restricts fluid flow through the second flow channels.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
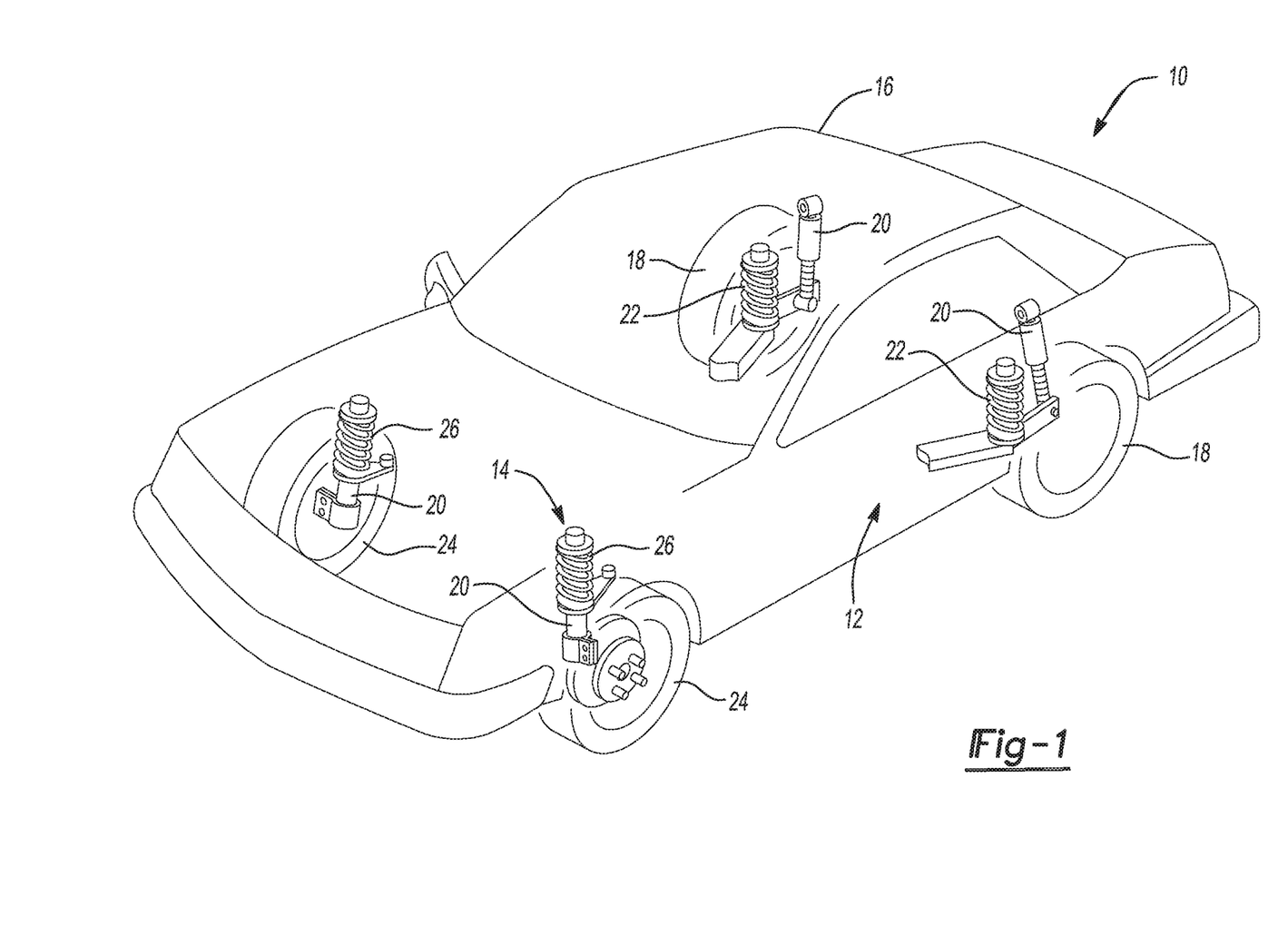
FIG. 1 is an illustration of a vehicle having a damper system which incorporates an electrically adjustable hydraulic shock absorber and a damper module.

FIG. 1 includes an example of a vehicle 10 incorporating a suspension system having dampers with an integrated electronic system. The vehicle 10 includes a rear suspension 12, a front suspension 14, and a body 16. The rear suspension 12 has a transversely extending rear axle assembly (not shown) adapted to operatively support a pair of rear wheels 18. The rear axle assembly is attached to the body 16 by means of a pair of damper systems 20 and by a pair of springs 22. Similarly, the front suspension 14 includes a transversely extending front axle assembly (not shown) to operatively support a pair of front wheels 24. The front axle assembly is attached to the body 16 by means of a pair of the damper systems 20 and by a pair of springs 26.

The damper systems 20 serve to dampen the relative motion of the unsprung portion (i.e., the front and rear suspensions 12, 14) with respect to the sprung portion (i.e., the body 16) of the vehicle 10. While the vehicle 10 has been depicted as a passenger car having front and rear axle assemblies, the damper system 20 may be used with other types of vehicles or in other types of applications including, but not limited to, vehicles incorporating non-independent front and/or non-independent rear suspensions, vehicles incorporating independent front and/or independent rear suspensions or other suspension systems known in the art. In addition, the damper system 20 may also be used on all wheeled and/or tracked vehicles. For example the damper system 20 may be used on two and/or three wheels type of vehicles, such as motorcycles and all-terrain vehicles. The damper system 20 can also be used in conjunction with a steering system of a vehicle to damp relative motion between two steering wheels.

Figure 2:
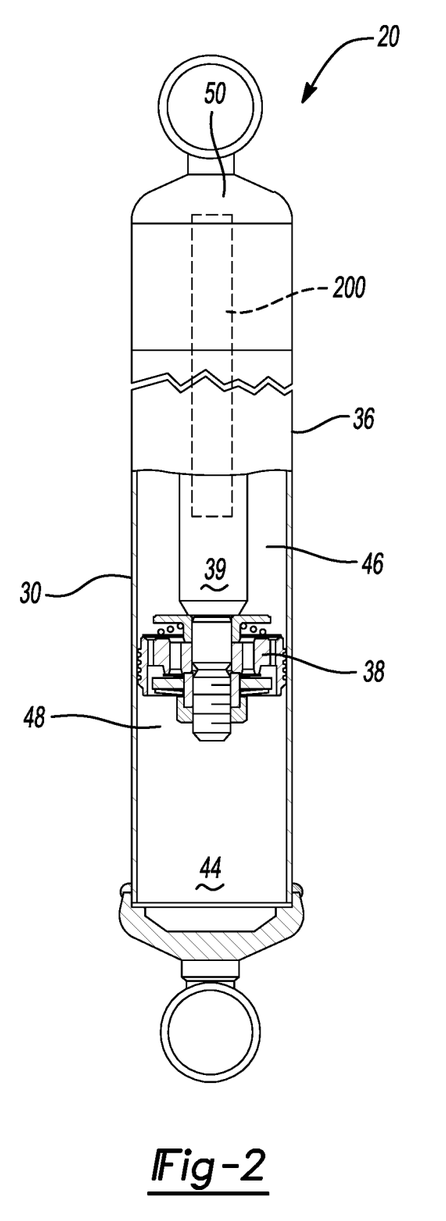
FIG. 2 is a perspective view of an example single tube damper system.
Figure 3:
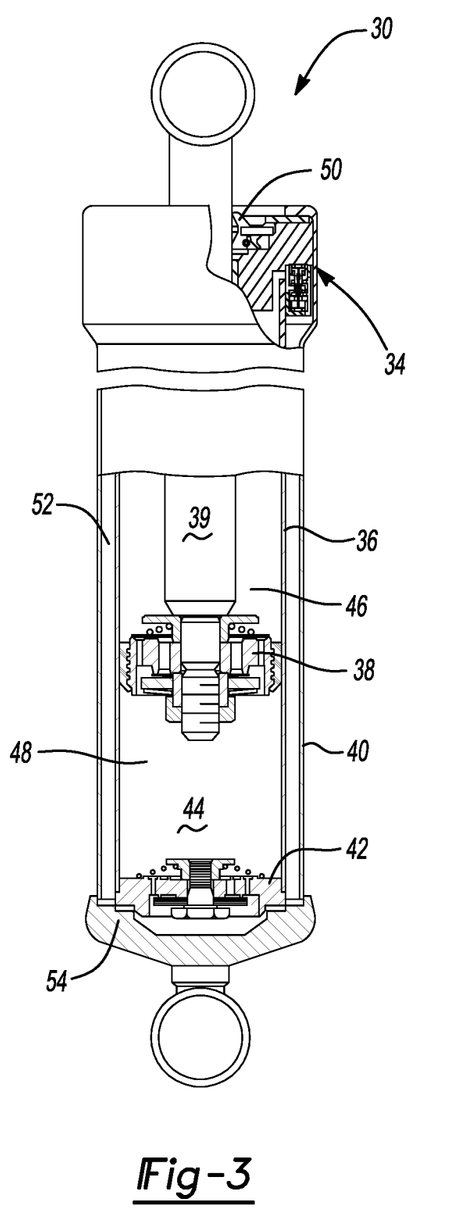
FIG. 3 is a fragmentary view of an example dual tube damper system.
Figure 4:
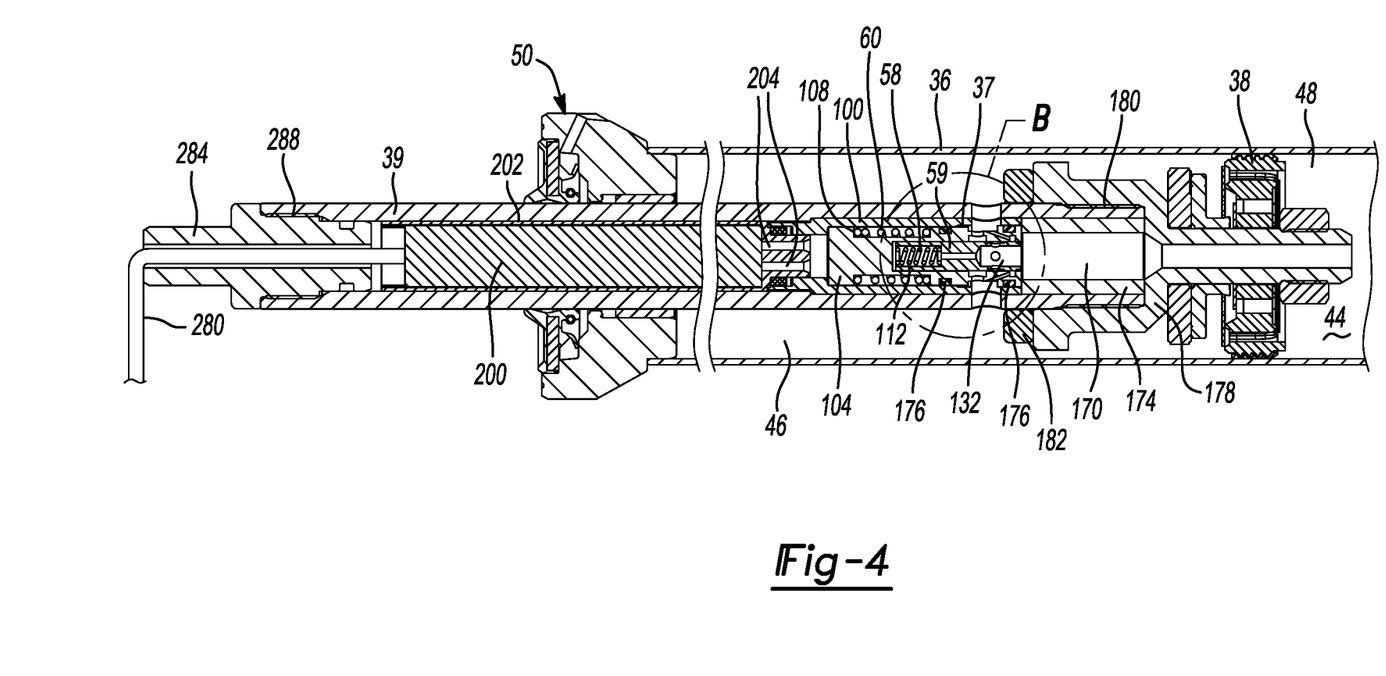
FIG. 4 is a cross-sectional view of a portion of a shock absorber.

FIG. 2 includes a perspective view of an example of the damper system 20. The damper system 20 includes an electrically adjustable hydraulic shock absorber 30 ("shock absorber 30" hereinafter) including an internal printed circuit board assembly 200. The shock absorber 30 may be a single tube (mono-tube) configuration (e.g., as shown in FIG. 2) or a dual tube configuration, such as shown in FIG. 3. FIG. 4 includes a cross-sectional view of a portion of the shock absorber 30 of FIG. 2.

The shock absorber 30 includes a pressure tube 36, a piston assembly 38, a piston rod 39. As shown in FIG. 3, the shock absorber 30 may also include a reserve tube 40 in the example of a dual tube configuration and a base valve assembly 42. While single (mono) tube and dual tube examples are provided, the damper system 20 may alternatively include a configuration including more than two tubes.

The pressure tube 36 defines a working chamber 44. The piston assembly 38 is slidably disposed within the pressure tube 36 and divides the working chamber 44 into an upper (or first) working chamber 46 and a lower (or second) working chamber 48. The piston rod 39 is attached at one end to the piston assembly 38. The piston rod 39 extends through the upper working chamber 46 and through a rod guide assembly 50. The rod guide assembly 50 closes the upper end of the pressure tube 36. The other end of the piston rod 39 opposite to the piston assembly 38 is adapted to be secured to one of the sprung mass of the vehicle 10 and the unsprung mass of the vehicle.

One or more valves (e.g. a compression valve and an extension valve) within the piston assembly 38 control the movement of fluid (e.g., liquid or gas) between the upper working chamber 46 and the lower working chamber 48 during movement of the piston assembly 38 within the pressure tube 36. An electronic valve 37 within the piston assembly 38 also controls the movement of fluid between the upper working chamber 46 and the lower working chamber 48 during movement of the piston assembly 38 within the pressure tube 36. Since the piston rod 39 extends through the upper working chamber 46 and not the lower working chamber 48, movement of the piston assembly 38 with respect to the pressure tube 36 causes a difference in the amount of fluid in the upper working chamber 46 and the amount of fluid in the lower working chamber 48. The fluid flows from one working chamber to another through the valve 37 and the piston rod 39 when the valve 37 is open.

As shown in FIG. 3, the reserve tube 40 surrounds the pressure tube 36 to define a fluid reservoir chamber 52 located between the reserve tube 40 and the pressure tube 36. The bottom end of the reserve tube 40 and the pressure tube 36 is closed by a base cup 54. The base cup 54 can be secured to the other one of the unsprung mass of the vehicle 10 and the sprung mass of the vehicle 10.

The upper end of reserve tube 40 is attached to the rod guide assembly 50. The base valve assembly 42 is disposed between the lower working chamber 48 and the reservoir chamber 52 to control the flow of fluid between the upper and lower working chambers 46 and 48. When the shock absorber 30 extends in length, an additional volume of fluid may flow from the reservoir chamber 52 to the lower working chamber 48 through, for example, the base valve assembly 42. When the shock absorber 30 compresses in length, an excess of fluid may flow from the lower working chamber 48 to the reservoir chamber 52 through the base valve assembly 42, the piston assembly 38, or a combination thereof. The reserve tube 40 is not present in the mono tube example.

As stated above, the shock absorber 30 includes only the one valve 37 that is located within the piston rod 39. The shock absorber 30 does not include any other electronic valves within the piston rod 39. The valve 37 may be a digital valve, a variable state valve, or another other suitable type of electronic valve.

The valve 37 includes a biasing device 58 (e.g., a spring) that biases a spool 59 of the valve 37 toward a closed position. The spool 59 may also be referred to as an armature. The valve 37 also includes an inductor coil 60 that controls the actuation (opening and closing) of the spool 59. More specifically, when power is applied to the coil 60, the coil 60 creates a magnetic field that overcomes the biasing force of the biasing device 58 and pulls the spool 59 toward and to an open position. When power is not applied to the coil 60, the coil 60 does not generate magnetic field and the biasing device 58 biases the spool 59 toward and to the closed position.

Figure 5:
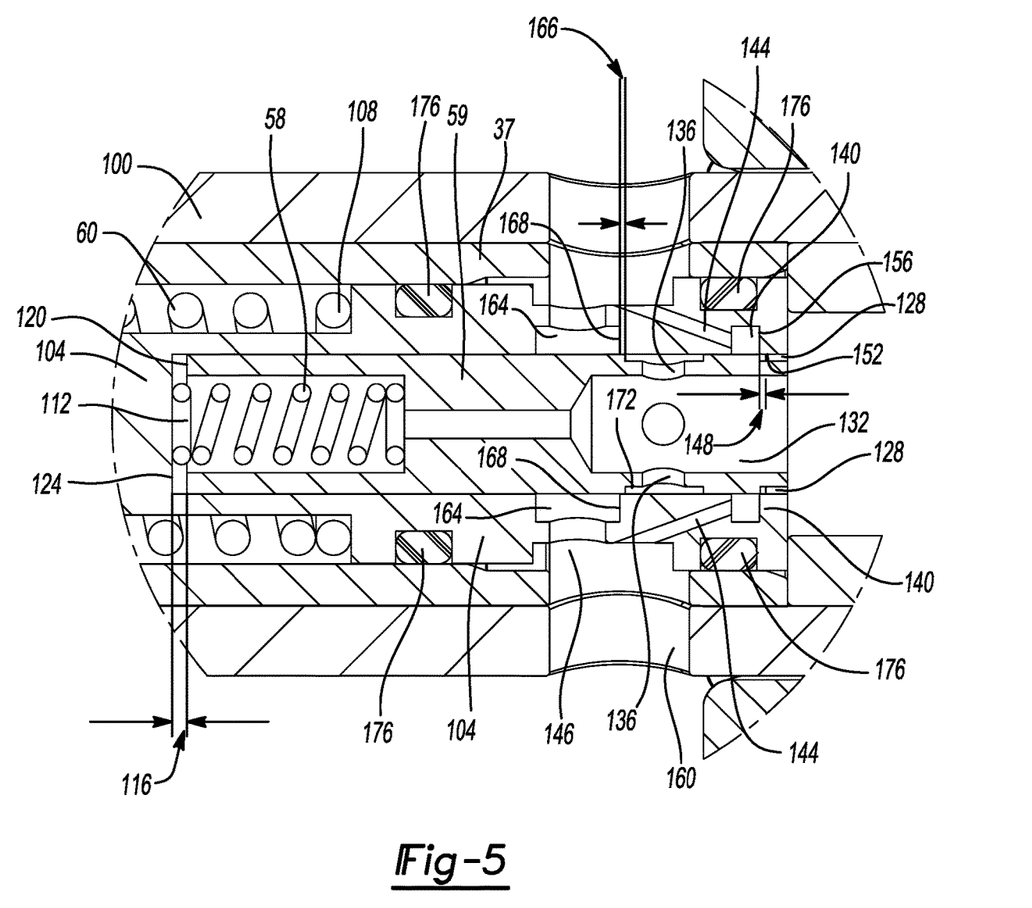
FIGS. 5-7 are expanded cross-sectional views showing detail within the circle denoted as B in FIG. 4.
Figure 6:
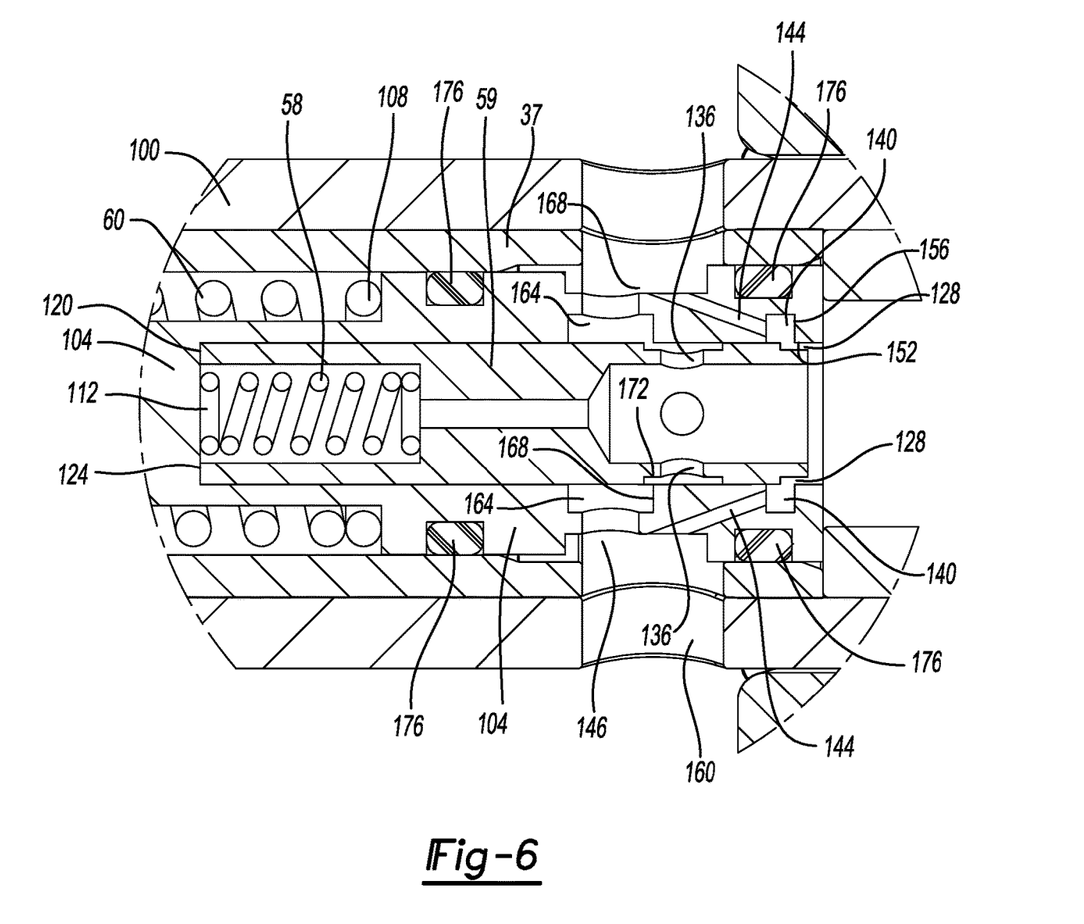
Figure 7:
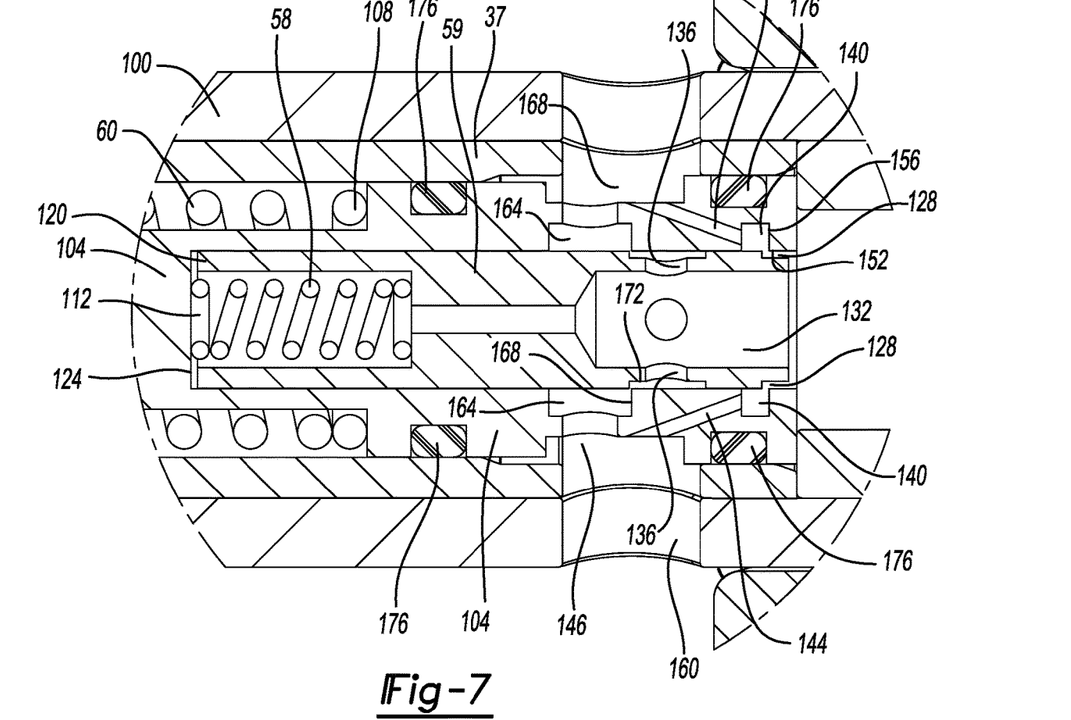

FIGS. 5-7 include expanded cross-sectional views showing detail within the circle denoted as B in FIG. 4. In FIG. 5, the spool 59 is shown in the closed position. In FIG. 6, the spool 59 is shown in the open position. In FIG. 7, the spool 59 is shown at a position between the open position and the closed position achieved during travel of the spool 59 from the open position to the closed position or from the closed position to the open position.

Figure 8:
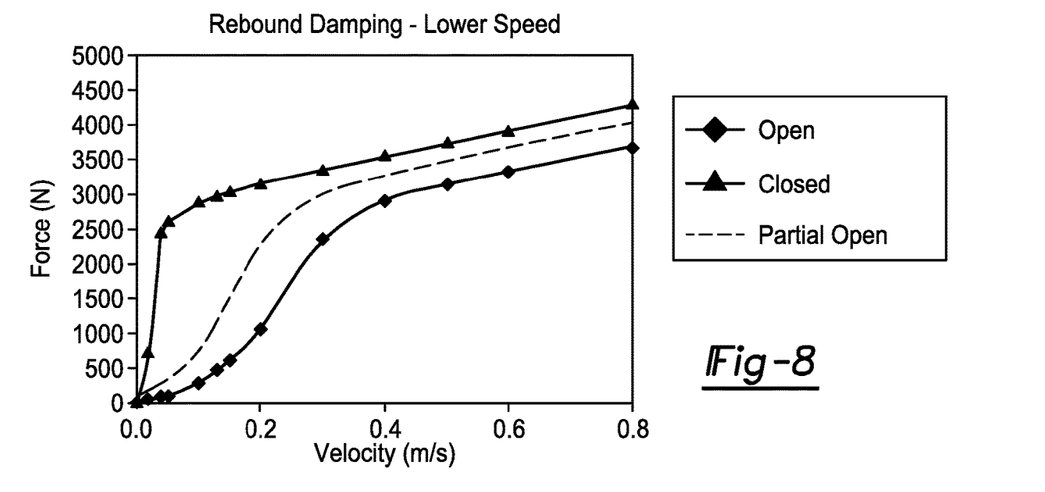
FIG. 8 is an example graph of damping force versus piston rod velocity during rebound (compression) of the shock absorber.

The actuation of the valve 37 controls the flow of fluid between the upper working chamber 46 and the lower working chamber 48 through the valve 37. More specifically, when the spool 59 is in the open position (e.g., FIG. 6), fluid can flow between the lower working chamber 48 and the upper working chamber 46 through the valve 37 at up to a first predetermined maximum flowrate. When the spool 59 is in the open position, the shock absorber 30 therefore provides a first (low) damping force. When the spool 59 is in a position between the open position and the closed position (non-inclusive, e.g., FIG. 7), fluid can flow between the lower working chamber 48 and the upper working chamber 46 through the valve 37 at up to a second predetermined maximum flowrate that is less than the first predetermined maximum flowrate. When the spool 59 is in between the open position and the closed position, the shock absorber 30 therefore provides a second (intermediate) damping force that is greater than the first damping force. When the spool 59 is in the closed position (e.g., FIG. 5), fluid cannot flow between the lower working chamber 48 and the upper working chamber 46 through the valve 37. The spool 59 blocks fluid flow between the lower working chamber 48 and the upper working chamber 46 when the spool 59 is in the closed position. When the spool 59 is in the closed position, the shock absorber 30 therefore provides a third (high) damping force (via the valve(s) in the piston assembly 39) that is greater than the second damping force. FIG. 8 includes an example graph of damping force versus piston rod velocity during rebound (compression) of the shock absorber 30.

Referring back to FIGS. 4-7, the valve 37 includes a housing 100, a body 104 located coaxially within the housing 100. The spool 59 is located coaxially within the body 104. The coil 60 is wrapped around and located in an annular groove 108 formed in an outer surface of the body 104. The biasing device 58 is located in a biasing device cavity 112 formed within the spool 59.

When the spool 59 is in the closed position, a first predetermined distance 116 is present between an end 120 of the spool 59 and an inner surface 124 of the body 104. When the spool 59 is in the open position, the end 120 of the spool 59 contacts the inner surface 124 of the body 104. In other words, the distance between the end 120 of the spool 59 and the inner surface 124 of the body 104 is zero when the spool 59 is in the open position.

The spool 59 also includes a plurality of cavities 128 formed in an outer surface (land) of the spool 59. The spool 59 also includes a central cavity 132 and a plurality of apertures 136. The apertures 136 (ports) extend through the outer surface of the spool 59 and to the central cavity 132 and form first flow channels through the valve 37.

The body 104 includes a plurality of cavities 140 formed in an inner surface of the body 104. A plurality of second flow channels 144 extend between the cavities 140 and a plurality of cavities 146 in an outer surface of the body 104. When the spool 59 is in the closed position, a second predetermined distance 148 is present between edges 152 of the cavities 128 and edges 156 of the cavities 140. The second predetermined distance 148 is less than the first predetermined distance 116. For example, the second predetermined distance 148 may be approximately ⅓ of the first predetermined distance 116.

Apertures 160 are formed through the piston rod 39. The cavities 146 are formed on the outer surface of the body 104 and are coaxially aligned with the apertures 160. The body also includes cavities 164 formed on the inner surface of the body 104. The cavities 146 are fluidly connected with the cavities 164.

When the spool 59 is in the closed position, a third predetermined distance 166 is present between edges 168 of the cavities 164 and edges 172 of the cavities 136/lands of the spool 59. The third predetermined distance 166 is less than the first predetermined distance 116. For example, the third predetermined distance 166 may be approximately ⅔ of the first predetermined distance 116. In various implementations, the second predetermined distance 148 plus the third predetermined distance 166 may be equal to the first predetermined distance 116. The valve 37 may include sealing devices (e.g., O-rings) 176 configured to create a fluid seal between the spool 59 and the body 104.

When the spool 59 is in the open position, as shown in FIG. 6, fluid can flow between the upper and lower working chambers 46 and 48 through both the second flow channels 144 and the first flow channels (via the cavities 136 and 164). When the spool 59 is in a position between the open position and the closed position, fluid can flow between the upper and lower working chambers 46 and 48 only through the second flow channels 144 and not the first flow channels and the cavities 136 and 164. Fluid flows to and from valve 37 through a rod passageway 170 through a sleeve 174 located within the end of the piston rod 39 and a rod post 178 that is connected to the piston valve assembly 38. The piston rod 39 may include threads that engage threads of the rod post 178, as illustrated by 180. The shock absorber 30 may also include a rebound bumper 182.

As shown in FIG. 4, a printed circuit board assembly (PCBA) 200 is also located within the piston rod 39. More specifically, the PCBA 200 is implemented within a sleeve 202 that is located coaxially within the piston rod 39. The PCBA 200 is electrically connected to the coil 60 via conductors 204.

Figure 9:
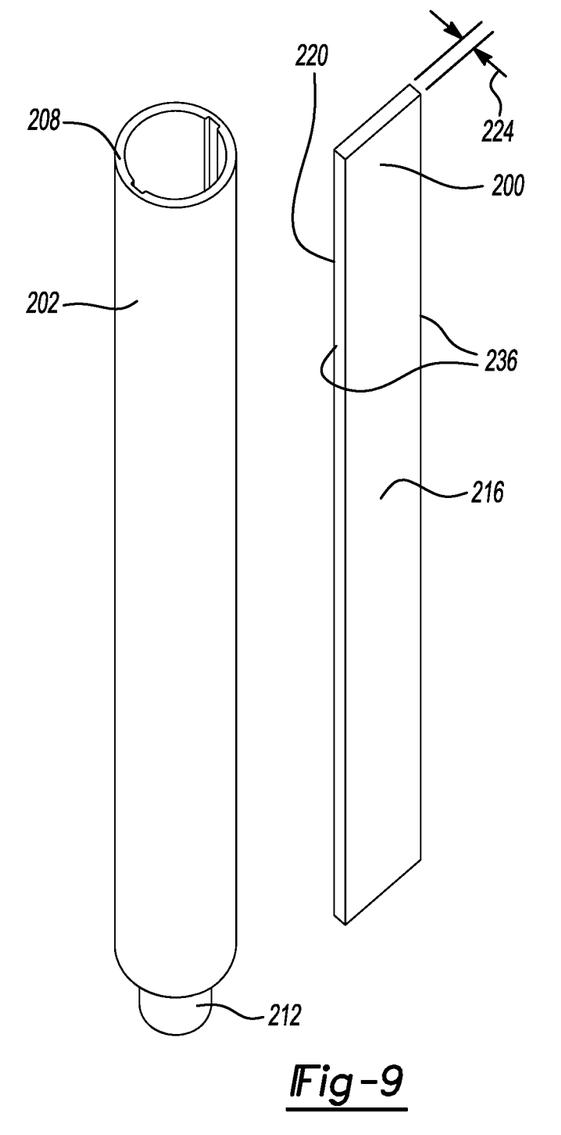
FIG. 9 is a perspective view including a sleeve and a printed circuit board assembly (PCBA)
Figure 10:
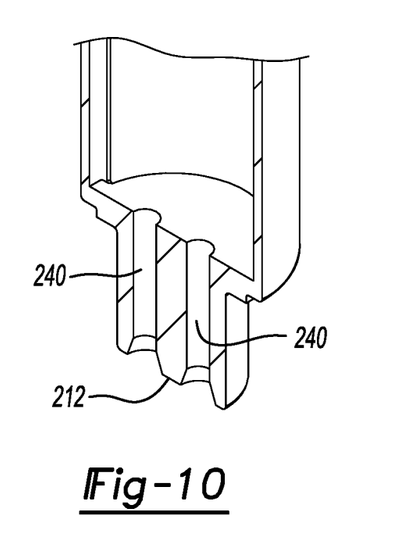
FIGS. 10 and 11 are cross-sectional perspective views of an end of the sleeve.
Figure 11:
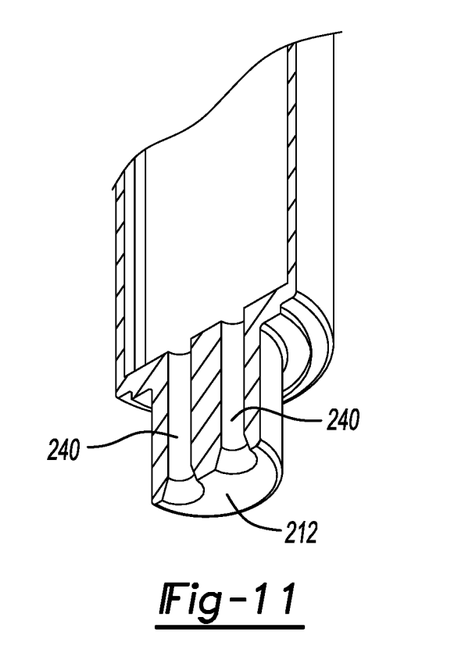
Figure 12:
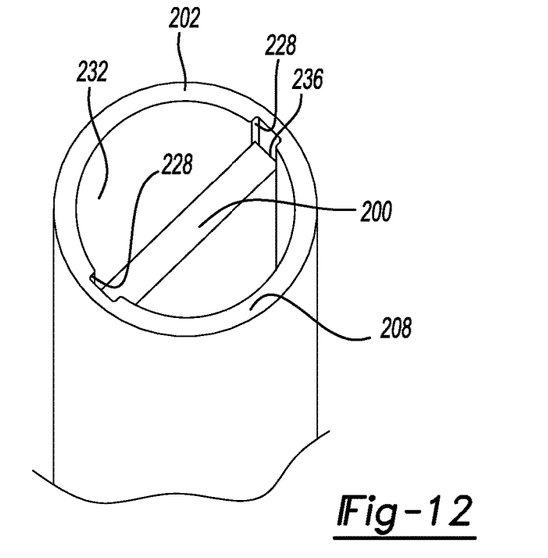
FIG. 12 is a perspective view of an end with a PCBA secured within the sleeve.

FIG. 9 includes a perspective view including the sleeve 202 and the PCBA 200. The sleeve includes a first end 208 and a second end 212. FIGS. 10 and 11 include cross-sectional perspective views of the second end 212 of the sleeve 202. FIG. 12 includes a perspective view of the first end 208 with the PCBA 200 secured within the sleeve 202. As shown, the PCBA 200 may include first and second rectangular faces 216 and 220. The PCBA includes a thickness 224 between the first and second rectangular faces 216 and 220. Lengths and widths of the first and second rectangular faces 216 and 220 are greater than the thickness 224.

As shown in FIGS. 9 and 12, the sleeve 202 may include rectangular grooves 228 formed on diametrically opposite sides of an inner surface 232 of the sleeve 202. Lateral sides 236 of the PCBA 200 are disposed within the grooves 228. The PCBA 200 may be secured within the sleeve 202, for example, via an interference fit and/or via an adhesive. As shown in FIGS. 10 and 11, apertures 240 extend through the second end 212 of the sleeve 202. The conductors 204 that electrically connect the PCBA 200 with the coil 60 extend through the apertures 240.

As shown in FIG. 4, wires 280 connected to the PCBA 200 extend through a rod stem 284 that is coupled to the piston rod 39. The piston rod 39 may include threads that engage threads of the rod stem 284, as illustrated by 288. The wires 280 may include, for example, a first wire configured to be connected to a positive reference potential, a second wire configured to be connected to a negative (e.g., ground) reference potential, and one or more wires configured to communicate parameters to and from the PCBA 200. The positive reference potential and the negative reference potential or reference potentials generated from the positive and negative reference potentials are connected to the coil 60 to open the valve 37.

Figure 13:
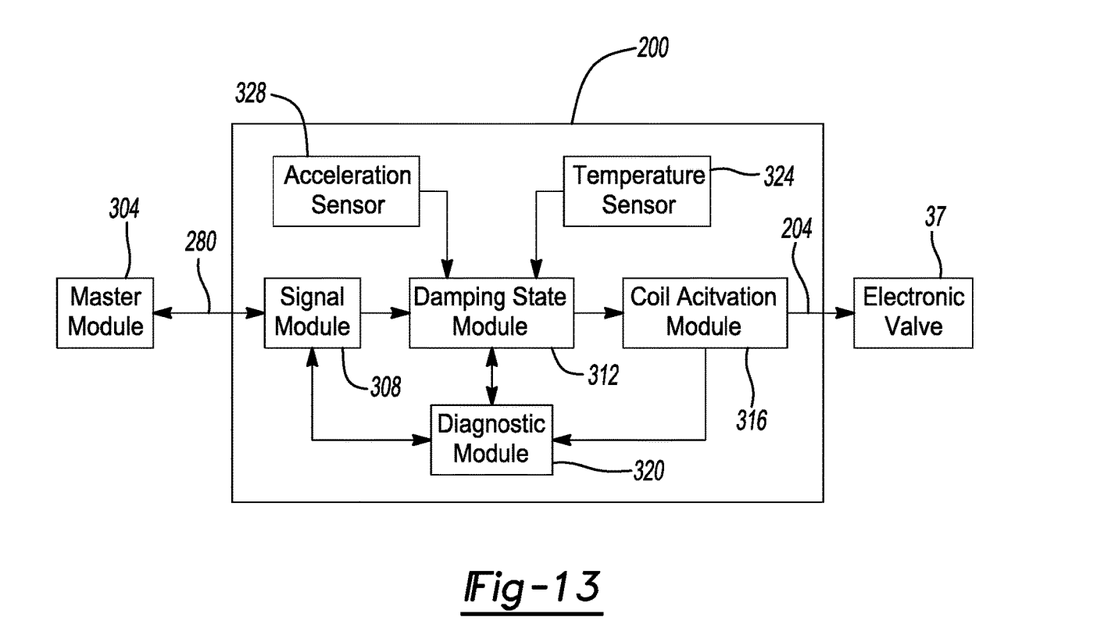
FIG. 13 is a functional block diagram of an example implementation of the PCBA.

FIG. 13 includes a functional block diagram of an example implementation of the PCBA 200. The PCBA 200 controls damping characteristics of the shock absorber 30. For example, in the example embodiment, the PCBA 200 controls the damping characteristics of the shock absorber 30 by controlling the actuation of the valve 37 disposed within the piston rod 39. Each damper system 20 includes a PCBA that controls operation of the shock absorber of that damper system 20.

A master module 304 of the vehicle 10, such as a gateway, may provide a target damper setting. The master module 304 communicates with other modules of the vehicle 10 via a network, such as local interconnect network (LIN), a controller area network (CAN), or another suitable type of vehicle network.

Based on the target damper setting, the PCBA controls the valve 37 disposed within the shock absorber 30, such that the shock absorber 30 operates at a target damping state (e.g., high or low damping force). The PCBA 200 includes a signal module 308, a damping state module 312, a coil activation module 316 implemented on a printed circuit board (PCB). The PCBA 200 may also include a diagnostic module 320. The PCBA 200 also includes a temperature sensor 324 and an acceleration sensor 328.

The signal module 308 decodes signals received from an external device, such as the master module 304. For example, the signal module 308 may receive the target damper setting from the master module 304. The signal module 308 may also transmit signals to the external device. For example, the signal module 308 may transmit data regarding a fault detected by the diagnostic module 320, acceleration of the piston rod 39 measured by the acceleration sensor 328, a temperature of the PCBA 200 measured by the temperature sensor 324, and/or other data.

The damping state module 312 generates a signal indicative of whether or not to apply power to the coil 60. The damping state module 312 may generate the signal, for example, based on the data received from the signal module 308, the acceleration measured by the acceleration sensor 328, and/or the temperature measured by the temperature sensor 324. The damping state module 312 may set the signal to a first state to indicate to apply power to the coil 60. The damping state module 312 may set the signal to a second state to indicate to not apply power to the coil 60.

The coil activation module 316 applies or does not apply power to the coil 60 based on the signal from the damping state module 312. For example, the coil activation module 316 applies power to the coil 60 when the signal is in the first state and not apply power to the coil 60 when the signal is in the second state.

The diagnostic module 320 monitors the operation of the coil activation module 316 and the valve 37 for any faults and/or failures. If a fault is detected the diagnostic module 320 may notify the damping state module 312. The damping state module 312 may then control the shock absorber 30 to a predetermined operation state. Information regarding the fault may also be transmitted to one or more external devices via the master module 304.

Figure 14:
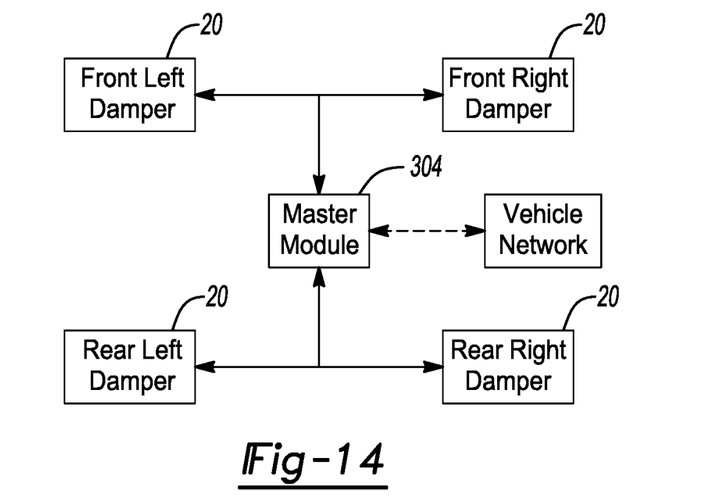
FIG. 14 is a functional block diagram including an example implementation of a damper system 20 at each wheel of the vehicle.
Figure 15:
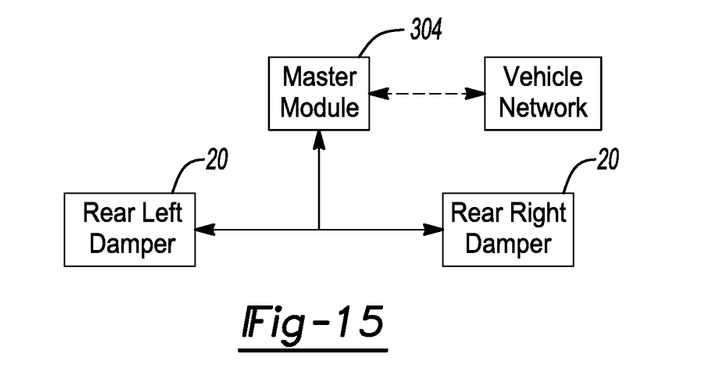
FIG. 15 is a functional block diagram of an example implementation of damper systems only at a pair of wheels of the vehicle, such as rear wheels of the vehicle.
Figure 16:
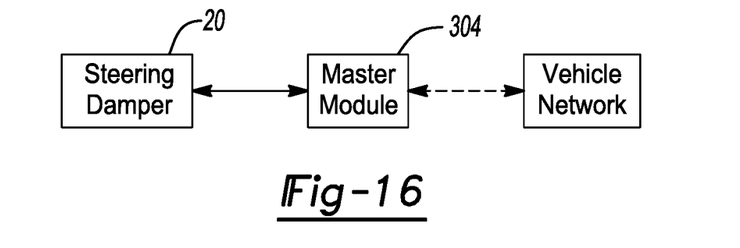
FIG. 16 is a functional block diagram of an example implementation of a damper system of a steering system.

As discussed above, one damper system 20 may be provided for each wheel of the vehicle 10. FIG. 14 includes a functional block diagram including an example implementation of a damper system 20 at each wheel of the vehicle. FIG. 15 includes a functional block diagram of an example implementation of damper systems 20 only at a pair of wheels of the vehicle, such as rear wheels of the vehicle. FIG. 16 includes a functional block diagram of an example implementation of a damper system 20 of a steering system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A shock absorber comprising:
a pressure tube defining a working chamber;
a piston assembly slidably disposed within the pressure tube, the piston assembly dividing the working chamber into a first chamber and a second chamber;
a piston rod including a first end that is attached to the piston assembly and that includes a second end that is configured to be attached to one of a sprung mass and an unsprung mass of a vehicle; and
an electronic valve that is positioned within the piston rod, the electronic valve including a spool moveable between a first position and a second position, the electronic valve further including a biasing device configured to bias the spool toward the second position and an inductor coil configured to draw the spool toward the first position when electrical power is applied to the inductor coil, wherein:
when the spool of the electronic valve is in the first position, the spool allows fluid flow between the first and second chambers through the electronic valve and the piston rod; and
when the spool of the electronic valve is in the second position, the spool restricts fluid flow between the first and second chambers.

2. The shock absorber of claim 1 wherein the shock absorber does not include any other electronic valves.

3. The shock absorber of claim 1 wherein the biasing device is located within a cavity formed in the spool.

4. The shock absorber of claim 1 wherein the electronic valve further includes:
a housing; and
a body located coaxially within the housing,
wherein the spool, the inductor coil, and the biasing device are located within the body.

5. The shock absorber of claim 4 wherein:
the spool includes first apertures;
the body includes second apertures;
the piston rod includes third apertures that are in fluid communication with the second apertures of the body; and
the first apertures are in fluid communication with the second apertures when the spool is in the first position.

6. The shock absorber of claim 5 wherein the spool is configured to block fluid flow between the first and second apertures when the spool is in the second position.

7. The shock absorber of claim 5 wherein:
the body further includes:
fourth apertures located on an inner surface of the body;
flow channels that fluidly connect the fourth apertures with the second apertures; and
the spool further includes fifth apertures formed in an outer surface of the spool that are in fluid communication with the fourth apertures when the spool is in a position between the first position and the second position.

8. The shock absorber of claim 7 wherein the spool is configured to block fluid flow between the fifth and fourth apertures when the spool is in the second position.

9. The shock absorber of claim 5 wherein:
the body further includes:
fourth apertures located on an inner surface of the body;
flow channels that fluidly connect the fourth apertures with the second apertures; and
the spool further includes an annular groove formed in an outer surface of the spool that is in fluid communication with the fourth apertures when the spool is in a position between the first position and the second position.

10. A shock absorber comprising:
a pressure tube defining a working chamber;
a piston assembly slidably disposed within the pressure tube, the piston assembly dividing the working chamber into a first chamber and a second chamber;
a piston rod including a first end that is attached to the piston assembly and that includes a second end that is configured to be attached to one of a sprung mass and an unsprung mass of a vehicle; and
an electronic valve that is positioned within the piston rod, the electronic valve including a spool moveable between a first position and a second position, wherein;
when the spool of the electronic valve is in the first position, the spool allows fluid flow between the first and second chambers through the electronic valve and the piston rod; and
when the spool of the electronic valve is in the second position, the spool restricts fluid flow between the first and second chambers, wherein the electronic valve is configured to:
allow fluid flow between the first and second chambers at up to a first maximum flow rate when the spool is between the first position and the second position; and
allow fluid flow between the first and second chambers at up to a second maximum flow rate that is greater than the first maximum flow rate when the spool is in the first position.

11. A shock absorber comprising:
a pressure tube defining a working chamber;
a piston assembly slidable disposed within the pressure tube, the piston assembly diving the working chamber into a first chamber and a second chamber;
a piston rod including a first end that is attached to the piston assembly and that includes a second end that is configured to be attached to one of a sprung mass and an unsprung mass of a vehicle;
a sleeve located within the piston rod;
a printed circuit board assembly (PCBA) that is located within the sleeve; and
an electronic valve that is positioned within the piston rod, the electronic valve including a spool moveable between a first position and a second position,
wherein:
when the spool of the electronic valve is in the first position, the spool allows fluid flow between the first and second chambers through the electronic valve and the piston rod; and
when the spool of the electronic valve is in the second position, the spool restricts fluid flow between the first and second chambers.

12. The shock absorber of claim 11 wherein the PCBA includes a coil activation module configured to selectively apply power to the electronic valve.

13. The shock absorber of claim 12 wherein:
the sleeve includes grooves formed in an inner surface of the sleeve; and
the PCBA includes lateral sides that are slidably disposed within the grooves.

14. A shock absorber comprising:
a pressure tube defining a working chamber;
a piston assembly slidably disposed within the pressure tube, the piston assembly dividing the working chamber into a first chamber and a second chamber;
a piston rod including a first end that is attached to the piston assembly and that includes a second end that is configured to be attached to one of a sprung mass and an unsprung mass of a vehicle;
an electronic valve including a spool moveable between a first position and a second position, wherein:
when the spool of the electronic valve is in a first position, allow fluid flow between the first and second chambers; and
when the spool of the electronic valve is in a second position, block fluid flow between the first and second chambers; and
a printed circuit board assembly (PCBA) that is located within the piston rod and that includes a module configured to selectively apply power to the electronic valve.

15. The shock absorber of claim 14 wherein the shock absorber further includes a sleeve that is located within the piston rod,
wherein the PCBA is located within the sleeve.

16. The shock absorber of claim 15 wherein:
the sleeve includes grooves formed in an inner surface of the sleeve; and
the PCBA includes lateral sides that are slidably disposed within the grooves.

17. The shock absorber of claim 14 wherein the shock absorber does not include any other electronic valves.

18. The shock absorber of claim 14 wherein the electronic valve includes:
the spool;
a biasing device configured to bias the spool toward the second position; and
an inductor coil configured to draw the spool toward the first position when electrical power is applied to the inductor coil.

19. The shock absorber of claim 18 wherein the electronic valve further includes:
a housing; and
a body located coaxially within the housing,
wherein the spool, the inductor coil, and the biasing device are located within the body.

20. The shock absorber of claim 19 wherein:
the spool includes first apertures;
the body includes second apertures;
the piston rod includes third apertures that are in fluid communication with the second apertures of the body; and
the first apertures are in fluid communication with the second apertures when the spool is in the first position.

21. The shock absorber of claim 20 wherein the spool is configured to block fluid flow between the first and second apertures when the spool is in the second position.

22. The shock absorber of claim 20 wherein:
the body further includes:
fourth apertures located on an inner surface of the body;
flow channels that fluidly connect the fourth apertures with the second apertures; and
the spool further includes fifth apertures formed in an outer surface of the spool that are in fluid communication with the fourth apertures when the spool is in a position between the first position and the second position.

23. The shock absorber of claim 22 wherein the spool is configured to block fluid flow between the fifth and fourth apertures when the spool is in the second position.

24. The shock absorber of claim 20 wherein:
the body further includes:
fourth apertures located on an inner surface of the body;
flow channels that fluidly connect the fourth apertures with the second apertures; and
the spool further includes an annular groove formed in an outer surface of the spool that is in fluid communication with the fourth apertures when the spool is in a position between the first position and the second position.

25. The shock absorber of claim 14 wherein the electronic valve is configured to:
allow fluid flow between the first and second chambers at up to a first maximum flow rate when the spool is between the first position and the second position; and
allow fluid flow between the first and second chambers at up to a second maximum flow rate that is greater than the first maximum flow rate when the spool is in the first position.

26. A shock absorber comprising:
a pressure tube defining a working chamber;
a piston assembly slidably disposed within the pressure tube, the piston assembly dividing the working chamber into a first chamber and a second chamber;
a piston rod including a first end that is attached to the piston assembly and that includes a second end that is configured to be attached to one of a sprung mass and an unsprung mass of a vehicle;
an electronic valve that is positioned within the piston rod, the electronic valve including a spool moveable between a first position and a second position, the spool including a first flow channel and a second flow channel that is distinct from the first flow channel,
wherein:
when the spool of the electronic valve is in the first position, fluid flows through both of the first and second flow channels;
when the spool of the electronic valve is in the second position, the spool restricts fluid flow through both of the first and second channels; and
when the spool of the electronic valve is at least temporality positioned at a third position that is between the first and second positions, fluid flows through the first flow channel and the spool restricts fluid flow through the second flow channels.

* * * * *